US009690754B2

(12) United States Patent
Lowney et al.

(10) Patent No.: US 9,690,754 B2
(45) Date of Patent: Jun. 27, 2017

(54) SYSTEM AND METHOD FOR DOCUMENT CREATION

(71) Applicants: Walter M. Lowney, Albuquerque, NM (US); Rick Ortiz, Rio Rancho, NM (US)

(72) Inventors: Walter M. Lowney, Albuquerque, NM (US); Rick Ortiz, Rio Rancho, NM (US)

(*) Notice: Subject to any disclaimer, the term of this patent is extended or adjusted under 35 U.S.C. 154(b) by 1113 days.

(21) Appl. No.: 13/860,878

(22) Filed: Apr. 11, 2013

(65) Prior Publication Data

US 2014/0310593 A1  Oct. 16, 2014

Related U.S. Application Data

(60) Provisional application No. 61/623,308, filed on Apr. 12, 2012.

(51) Int. Cl.
*G06F 17/00* (2006.01)
*G06F 17/21* (2006.01)
*G06F 17/24* (2006.01)
*G06F 17/22* (2006.01)

(52) U.S. Cl.
CPC ......... *G06F 17/212* (2013.01); *G06F 17/211* (2013.01); *G06F 17/217* (2013.01); *G06F 17/218* (2013.01); *G06F 17/2235* (2013.01); *G06F 17/24* (2013.01); *G06F 17/243* (2013.01); *G06F 17/248* (2013.01)

(58) Field of Classification Search
CPC .. G06F 17/217–17/218; G06F 17/2235; G06F 17/24; G06F 17/243; G06F 17/248; G06F 17/211–17/212
See application file for complete search history.

(56) References Cited

U.S. PATENT DOCUMENTS

| 6,199,082 B1 * | 3/2001 | Ferrel | G06F 17/3089 707/E17.005 |
| 6,826,727 B1 * | 11/2004 | Mohr | G06F 17/211 382/180 |
| 9,015,621 B2 * | 4/2015 | Dean | G06F 3/0481 715/771 |
| 2003/0172343 A1 * | 9/2003 | Leymaster | G06F 17/243 715/234 |

(Continued)

OTHER PUBLICATIONS

"Using the ETDR Word Template—Masters Theses and Reports", 2009, Information Technology Assistance Center, Kansas State University, pp. 22.*

*Primary Examiner* — Chau Nguyen
(74) *Attorney, Agent, or Firm* — Kevin Soules; Kermit D. Lopez; Luis M. Ortiz

(57) ABSTRACT

A document creation interface, including an input section and a document preview section, is provided and displayed to user in order to assist in document preparation and creation. The input section of the interface can contain a structure chart template having input blocks into which a user may provide input. The input blocks may be configured to include an expandable quick guide to assist user in entering relevant information into a given input block. A document is then generated from the input received and based on the organization of the structure chart template. The document can then be dynamically displayed in the document preview section of the interface.

20 Claims, 5 Drawing Sheets

(56) References Cited

U.S. PATENT DOCUMENTS

| | | | |
|---|---|---|---|
| 2004/0039990 A1* | 2/2004 | Bakar | G06F 17/243 |
| | | | 715/222 |
| 2004/0230508 A1* | 11/2004 | Minnis, Jr. | G06Q 10/10 |
| | | | 705/35 |
| 2005/0055624 A1* | 3/2005 | Seeman | G09B 5/062 |
| | | | 715/277 |
| 2006/0041539 A1* | 2/2006 | Matchett | G06F 17/30554 |
| 2007/0101259 A1* | 5/2007 | Grigoriadis | G06F 17/212 |
| | | | 715/205 |
| 2007/0166684 A1* | 7/2007 | Walker | G09B 7/02 |
| | | | 434/322 |
| 2007/0198952 A1 | 8/2007 | Pittenger | |
| 2007/0250783 A1* | 10/2007 | Wu | G06F 17/243 |
| | | | 715/762 |
| 2009/0132350 A1 | 5/2009 | Laurin et al. | |
| 2009/0157711 A1* | 6/2009 | Baer | G06F 17/3089 |
| 2010/0095197 A1* | 4/2010 | Klevenz | G06F 17/2247 |
| | | | 715/234 |
| 2011/0107204 A1* | 5/2011 | Cohen | G06F 17/211 |
| | | | 715/243 |
| 2011/0225522 A1* | 9/2011 | Kamiyama | G06F 8/34 |
| | | | 715/762 |

* cited by examiner

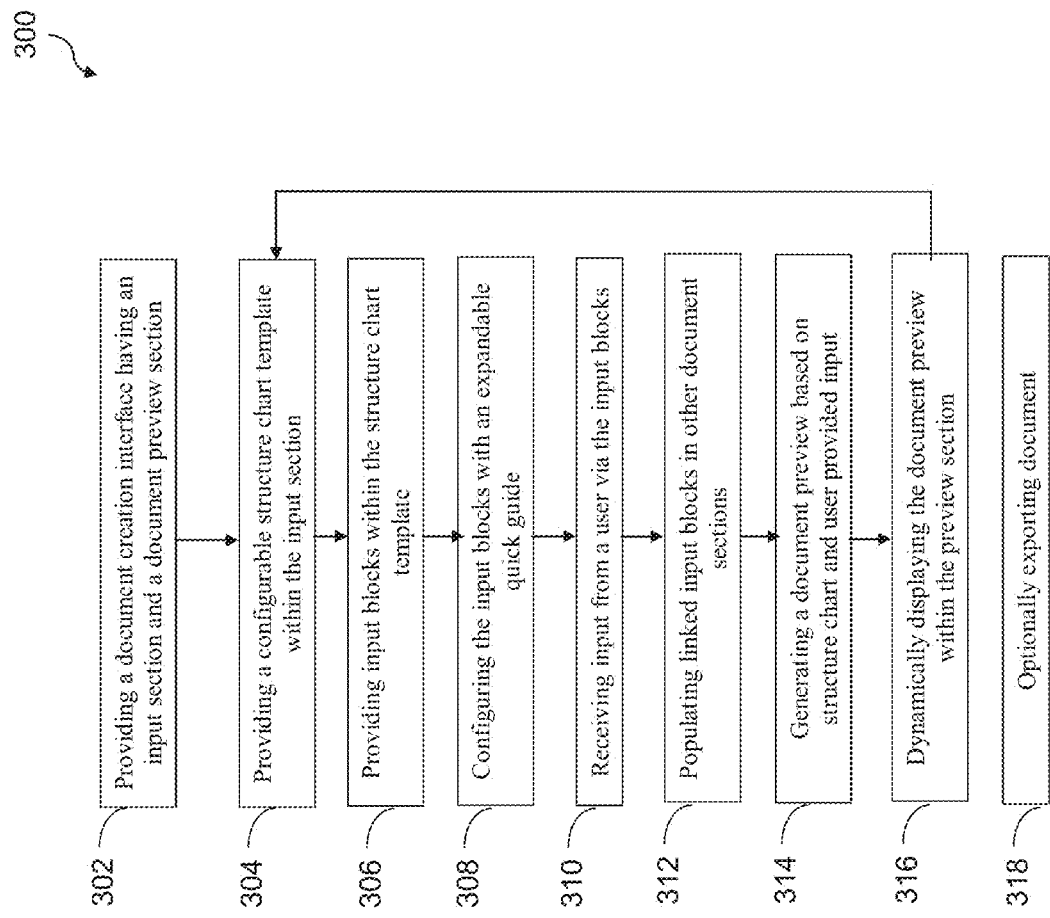

SYSTEM AND METHOD FOR DOCUMENT CREATION

CROSS-REFERENCE TO PROVISIONAL PATENT APPLICATION

This patent application claims the benefit under 35 U.S.C. §119(e) of U.S. Provisional Application Ser. No. 61/623,308 entitled, "System and Method for Document Creation," which was filed on Apr. 12, 2012 and is incorporated herein by reference in its entirety.

FIELD OF THE INVENTION

Embodiments generally relate to document assembly. More particularly, embodiments relate to assisted document creation.

BACKGROUND

Effective written communication is more important today than ever before. The main function of writing is to convey a message or thoughts effectively to the reader. This is particularly crucial in the business setting where most communication is in the form of written status reports, memos, email, technical reports, customer correspondence, and business proposals, just to name a few. To be effective and efficient, these documents should be well organized, clearly articulated, and concise in message. Writing is a difficult task for many because they either do not know how to start or stay on track with a systematic, organized method of writing that produces an effective document. While there are courses, training exercises, and technologies to help facilitate the writing process, the Inventors believe there is a need for a system that combines a method for effective writing with technology that provides a visual model and on-screen guidance to organize and create effective and understandable written communication.

SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for document assembly systems and methods.

It is another aspect of the disclosed embodiments to provide for methods and systems for assisted document creation.

The aforementioned aspects and other objectives and advantages can now be achieved as described herein. A document creation interface, including an input section and a document preview section, is be provided and displayed to user in order to assist in document preparation and creation. The input section of the interface can contain a structure chart template having input blocks into which a user may provide input. The input blocks may be configured to include an expandable quick guide to assist user in entering relevant information into a given input block. A document is then generated from the input received and based on the organization of the structure chart template. The document can then be dynamically displayed in the document preview section of the interface.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

FIG. 5 illustrates a flow chart of logical operations for a method of guided document creation and assembly, in accordance with the disclosed embodiments.

DETAILED DESCRIPTION

Figure 1:
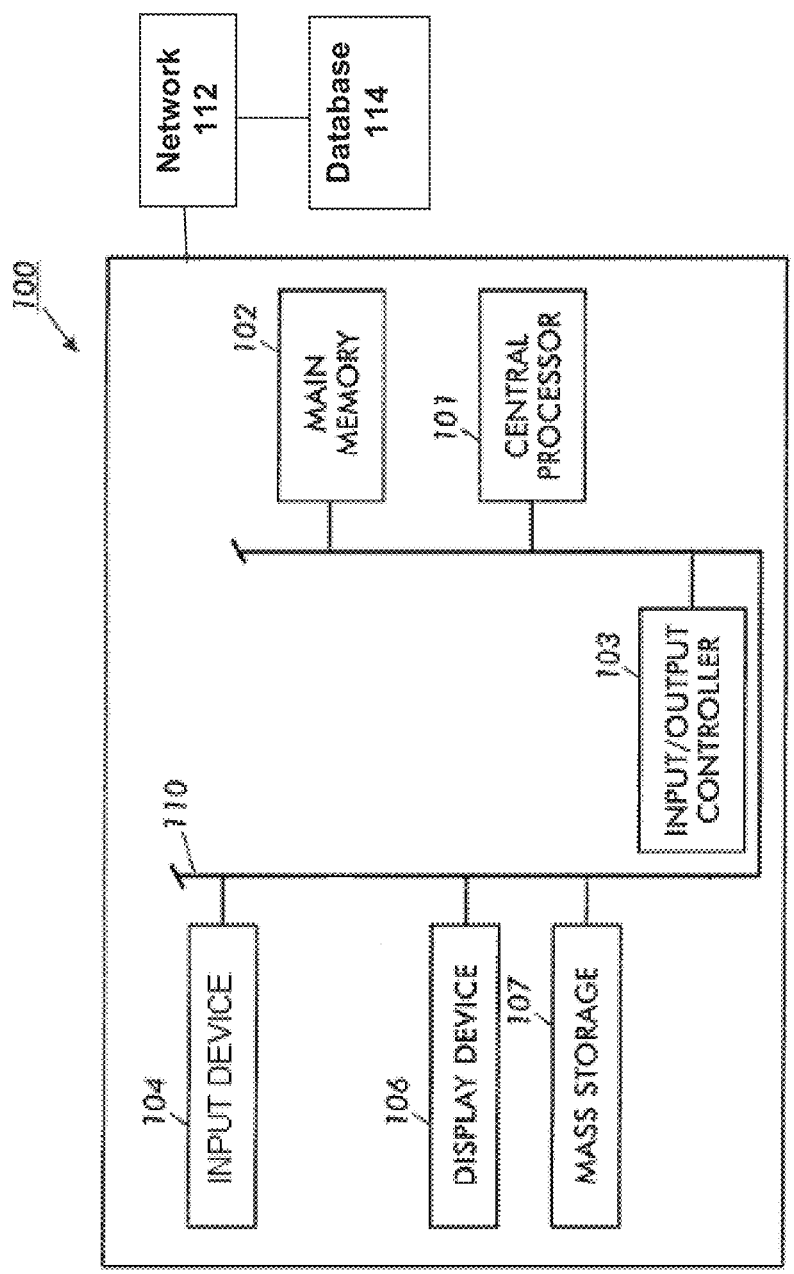
FIG. 1 illustrates a block diagram of a data-processing system, in accordance with the disclosed embodiments.

The embodiments will now be described more fully hereinafter with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Unnecessary detail of known functions and operations may be omitted from the current description so as not to obscure the disclosed embodiments. Like numbers refer to like elements throughout. As used herein, the term "and/or" includes any and all combinations of one or more of the associated listed items.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one skilled in the art, the present embodiments can be embodied as a method, data processing system, or computer program product. Accordingly, the present embodiments may take the form of an entire hardware embodiment, an entire software embodiment or an embodiment combining software and hardware. Further-more, the present embodiments may take the form of a computer program product on a non-transitory computer-usable storage medium having computer-usable program code embodied in the medium. Any suitable computer readable medium may be utilized including hard disks, USB Flash Drives, DVDs, CD-ROMs, optical storage devices, magnetic storage devices, etc.

The program code may execute entirely on a user's data processing device, partly on the user's data processing device, as a stand-alone software package, partly on the user's data processing device and partly on a remote data processing device or entirely on the remote data processing device. In the latter scenario, the remote data processing device may be connected to a user's data processing device through a local area network (LAN) or a wide area network (WAN), wireless data network e.g., WiFi, Wimax, 802.xx, and cellular network or the connection may be made to an external data processing device via most third party supported networks (for example, through the Internet using an Internet Service Provider).

The embodiments are described in part below with reference to flowchart illustrations and/or block diagrams of methods, systems, and computer program products and data structures according to the embodiments. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

FIG. 1 illustrates a block diagram of a data-processing system 100 that embodiments may be adapted for use with. The system 100 comprises a processor 101, a main memory 102, an input/output controller 103, an input device 104 (e.g., a mouse, track ball, keyboard, touch screen, etc.), a display device 106, and a mass storage 107. As illustrated, the various components of the data-processing system 100 communicate through a system bus 110 or similar architecture. Further, the data-processing system 100 is configured to communicate with a network 112 as well as a database 114. Embodiments of such a data-processing system may include personal computers, laptops, netbooks, tablets, cellular phones or any device having data-processing and networking capabilities. It should be appreciated that FIG. 1 is only exemplary and is not intended to assert or imply any limitation with regard to the environments in which aspects or embodiments can be implemented. Many modifications to the depicted environments can be made without departing from the spirit and scope of the disclosed embodiments.

The embodiments described herein can be implemented in the context of a host operating system on the data processing system 100 and one or more modules. Such modules may constitute hardware modules such as, for example, electronic components of a computer system. Such modules may also constitute software modules. In the computer programming arts, a software "module" can be typically implemented as a collection of routines and data structures that performs particular tasks or implements a particular abstract data type.

Software modules generally include instruction media storable within a memory location of a data-processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or methods upon which the module is based. The term "module" as utilized herein can therefore generally refer to software modules or implementations thereof. Such modules can be utilized separately or together to form a program product that can be implemented through non-transitory signal-bearing media, including transmission media and/or recordable media.

Figure 2:
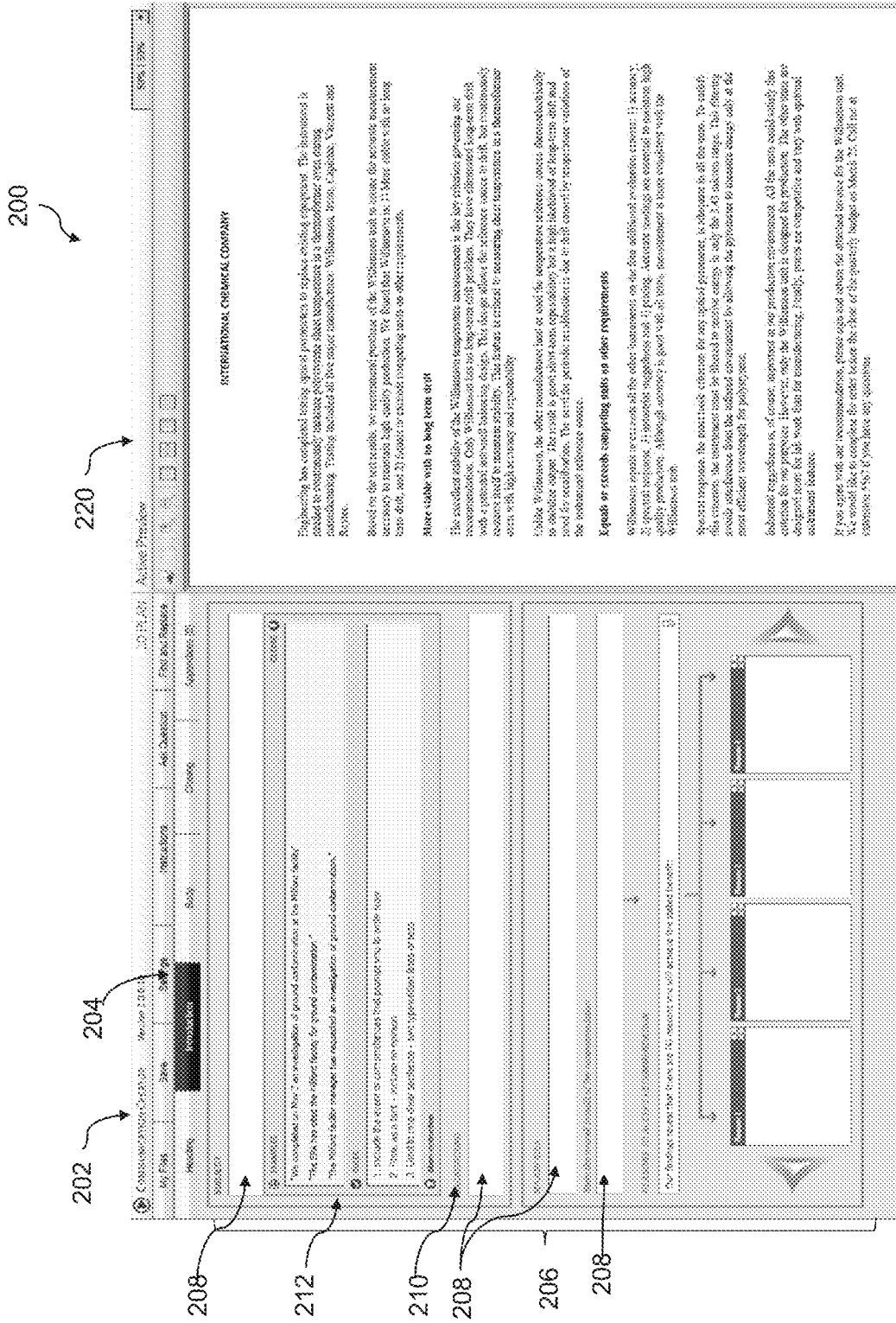
FIG. 2 illustrates a document creation interface for organizing and developing ideas in document drafting, in accordance with the disclosed embodiments.

FIG. 2 illustrates a document creation interface 200 for guided document drafting utilizing the data-processing system 100. The interface 200 is generated by the data-processing system 100 and displayed upon the display device 106. The interface 200 includes an input section 202 that provides structure for guided user input for each document section. The input section 202 provides selectable section tabs 204 for each individual document section. For example, section tabs 204 may be provided for a cover page, table of contents, body, conclusion, and appendices, as well as other document sections appropriate to the specific document type.

Each section tab 204 can contain a structure chart template 206 into which a user may enter information and ideas pertaining to the document being drafted. The structure chart template 206 provides a visual representation or blueprint of how the ideas are grouped, sequenced, and connected. A user can view and adjust the arrangement of ideas and information until each level is correctly grouped and the level above summarizes the level below and the level below directly supports the level above. The structure chart template 206 enables a user to sort out unneeded information and assure that all needed information is included.

The structure chart template 206 provides input blocks 208 into which text can be entered or images can be inserted. Labels 210 are provided for each input block 208 to guide a user in entering information specific to the document section. An expandable quick guide 212 may be associated with each input block 208 to provide examples of the type of information that should be entered, as well as rules that apply to the information being entered, in order to provide a user with real-time feedback for assessing their writing performance. The quick guide 212 can also include a link to the associated section within a full tutorial containing more detail and instruction. The input blocks 208 are configured to be movable, insertable or removable within the structure chart template 206 to allow flexibility in organizing information when needed.

The structure chart templates 206 for each document section are linked such that entries into an input block 208 of one structure chart template 206 may be carried over into other structure chart templates 206 to maintain consistency and organization within the document being created. For example, reasons that support a major recommendation that are entered into input blocks 208 under a section tab 202 for the introduction are automatically used to populate input blocks 208 within the section tab 202 for the body of the document to direct a user in entering supporting evidence or other information related to the originally entered reasons for the recommendation.

The document creation interface 200 also includes a preview section 220 to display the document being created from the information inputted within the input section 202. The preview section 220 is configured to dynamically reflect changes made within the input section 202. The preview section 220 may also be configured to allow editing of the document being created. Options for exporting the document to other programs or applications may also be provided within the preview section 220. The content of a document can also be saved to the database 114 in an easily searchable format.

Figure 3:
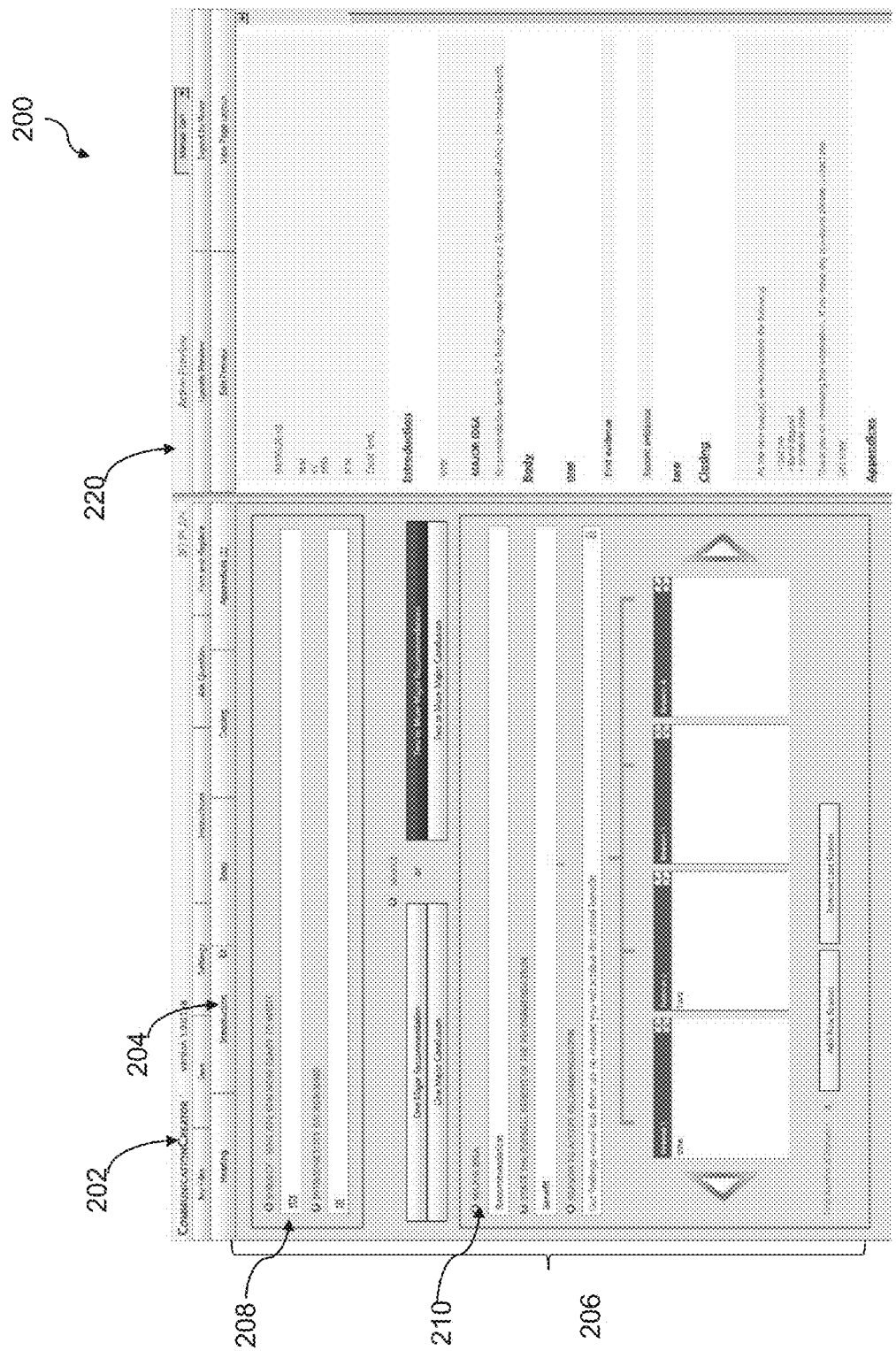
FIG. 3 illustrates an exemplary document creation interface and structure chart template for the introduction section of a document, in accordance with the disclosed embodiments.
Figure 4:
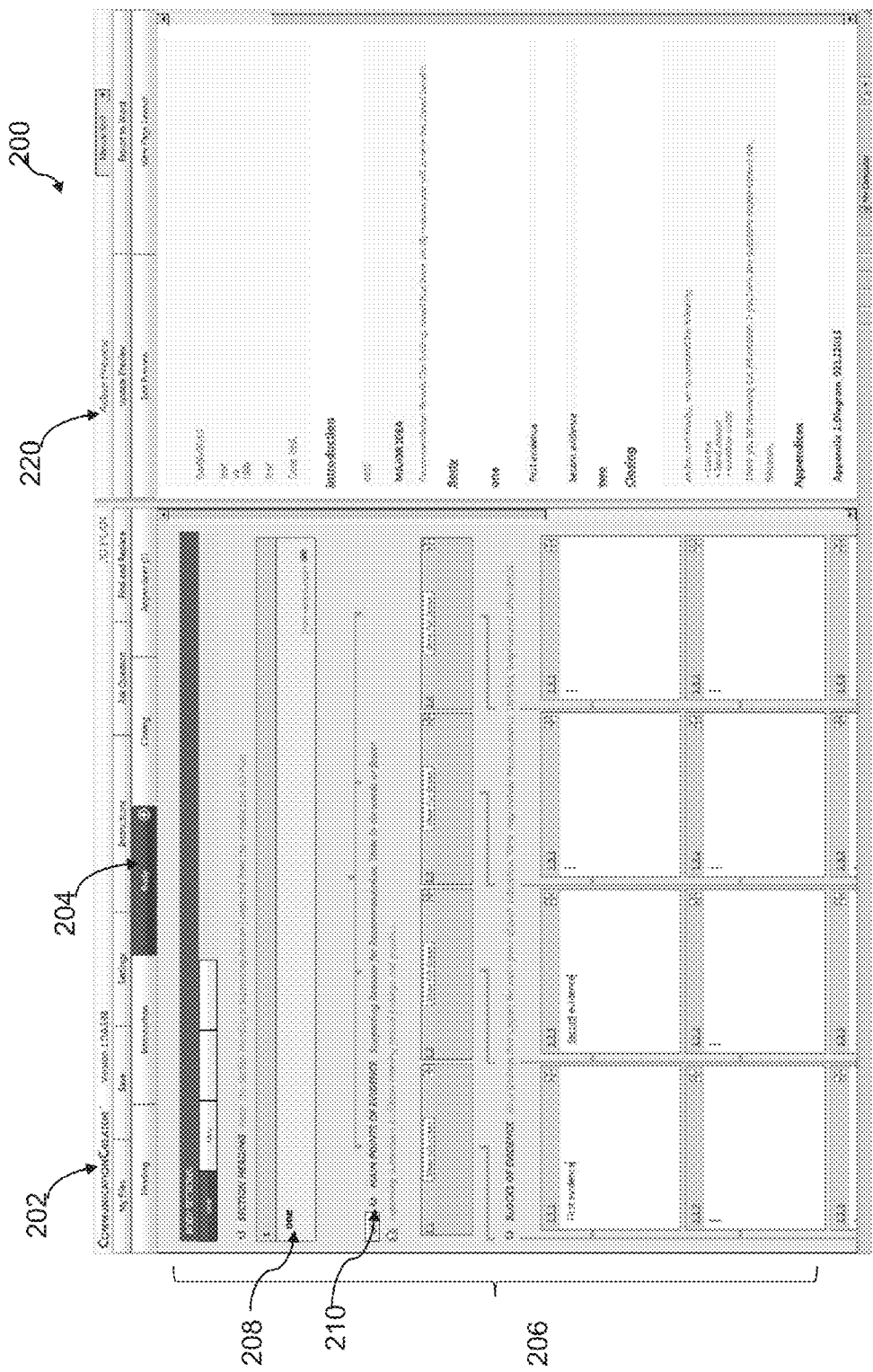
FIG. 4 illustrates an exemplary document creation interface and structure chart template for the body section of a document, in accordance with the disclosed embodiments.

FIGS. 3 and 4 show document creation interfaces 200 and exemplary structure chart templates 206 for the introduction and body sections of a document, respectively. Note that like numbers refer to like elements throughout the figures.

FIG. 5 illustrates a flow chart of logical operations for a method of guided document creation and assembly. Initially, a document creation interface 200 is provided which includes an input section 202 and a document preview section 220 (Step 302). A configurable structure chart 206 is provided within the input section 202 (Step 304). Within the structure chart 206, input blocks 208 are provided (Step 306) and configured to include an expandable quick guide 212 (Step 308). Input is received from the user via the input blocks 208 (Step 310).

The input may be in the form of text, graphics, pictures or charts. Input received at Step 310 may then be used to automatically populate linked input blocks within other sections of the document (Step 312). A preview of the document may be generated based on the received input and the hierarchical organization of the structure chart 206 (Step 314). The document can then be dynamically displayed within the document preview section 220 (Step 316). Changes that are made to the input or to the structure chart 206 will be reflected in the document preview section 220. The document may then be exported for use by other programs or applications (Step 318).

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A computer-implemented method of controlling an installation of a software application on a device, said computer-implemented method being performed by at least one processor and comprising:
   providing a document creation and idea development interface including an input section and a document preview section;
   providing a structure chart template within said input section wherein said structure chart template comprises a plurality of labeled input blocks;
   receiving input via said plurality of labeled input blocks within said structure chart template said input comprising at least one of text, graphics, images, and charts, which conveys said ideas;
   requiring entry of said input into each of said labeled input blocks with three rules associated with said at least one labeled input block;
   configuring said labeled input blocks to include an expandable quick guide;
   generating a plurality of logically organized sentences to form a document from said received input and said structure chart template;
   displaying said document in said document preview section of said document creation interface; and
   exporting said document for use by at least one other application.

2. The computer-implemented method of claim 1 wherein said input section comprises a plurality of selectable tabs corresponding to individual sections of said document.

3. The computer-implemented method of claim 2 wherein said plurality of selectable tabs contain the structure chart template having the plurality of labeled input blocks being linked to other labeled input blocks contained in other tabs.

4. The computer-implemented method of claim 3 further comprising automatically populating the other linked labeled input blocks within the other tabs with said received input.

5. The computer-implemented method of claim 1 wherein exporting said document for use by other applications further comprises exporting said document to at least one of a word processing application and a presentation application.

6. The computer-implemented method of claim 1 wherein said expandable quick guide comprises a link to a tutorial providing instructions related to the input to be provided by said user.

7. The computer-implemented method of claim 1 wherein said expandable quick guide comprises examples of the type of input to be provided by said user.

8. A system that controls an installation of software applications on a device, said system comprising:
   a processor embodied as hardware;
   a memory embodied as hardware coupled to the processor; and
   computer program code residing in the memory embodied as hardware that, when executed by the processor, causes the processor to perform a method, the method comprising:
   providing a document creation and idea development interface including an input section and a document preview section;
   providing a structure chart template within said input section wherein said structure chart template comprises a plurality of labeled input blocks;
   receiving input via said plurality of labeled input blocks within said structure chart template said input comprising at least one of text, graphics, images and charts, which conveys said ideas;
   requiring entry of said input into each of said labeled input blocks with three rules associated with said at, least one labeled input block;
   configuring said labeled input blocks to include an expandable quick guide;
   generating a plurality of logically organized sentences to for a document from said received input and said structure chart template;
   displaying said document in said document preview section of said document creation interface; and
   exporting said document for use by at least one other application.

9. The system of claim 8 wherein said input section comprises a plurality of selectable tabs corresponding to individual sections of said document.

10. The system of claim 9 wherein said plurality of selectable tabs contain the structure chart template having the plurality of labeled input blocks being linked to other labeled input blocks contained in other tabs.

11. The system of claim 10 further comprising automatically populating the other linked labeled input blocks within the other tabs with said received input.

12. The system of claim 8 wherein exporting said document for use by other applications further comprises exporting said document to at least one of a word processing application and a presentation application.

13. The system of claim 8 wherein said expandable quick guide comprises a link to a tutorial providing instructions related to the input to be provided by said user.

14. The system of claim 8 wherein said expandable quick guide comprises examples of the type of input to be provided by said user.

15. A non-transitory computer readable storage medium comprising computer readable program code that when executed by a processor causes the processor to perform operations comprising:
  providing a document creation and idea development interface including an input section and a document preview section;
  providing a structure chart template within said input section wherein said structure chart template comprises a plurality of labeled input blocks;
  receiving input via said plurality of labeled input blocks within said structure chart template comprising at least one of text, graphics, images, and charts, which conveys said ideas;
  requiring entry of said input into each of said labeled input blocks with three rules associated with said at least one labeled input block;
  configuring said labeled input blocks to include an expandable quick guide;
  generating a plurality of logically organized sentences to form a document configured to facilitate user understanding from said received input and said structure chart template;
  displaying said document in said document preview section of said document creation interface; and
  exporting said document for use by at least one other application.

16. The non-transitory computer readable storage medium of claim 15 wherein said input section comprises a plurality of selectable tabs corresponding to individual sections of said document.

17. The non-transitory computer readable storage medium of claim 15 wherein said plurality of selectable tabs contain the structure chart template having the plurality of labeled input blocks being linked to other labeled input blocks contained in other tabs.

18. The non-transitory computer readable storage medium of claim 15 further comprising automatically populating the other linked labeled input blocks within the other tabs with said received input.

19. The non-transitory computer readable storage medium of claim 15 wherein exporting said document for use by other applications further comprises exporting said document to at least one of a word processing application and a presentation application.

20. The non-transitory computer readable storage medium of claim 15 wherein said expandable quick guide comprises a link to a tutorial providing instructions related to the input to be provided by said user.

\* \* \* \* \*